(12) United States Patent
Hajarnis et al.

(10) Patent No.: US 12,056,592 B2
(45) Date of Patent: Aug. 6, 2024

(54) SYSTEM, METHOD, AND COMPUTER PROGRAM FOR TRANSFORMER NEURAL NETWORKS

(71) Applicant: Eightfold AI Inc., Mountain View, CA (US)

(72) Inventors: Sanjeet Hajarnis, Mountain View, CA (US); Varun Kacholia, Mountain View, CA (US); Tushar Makkar, Mountain View, CA (US); Xingjian Wang, Mountain View, CA (US); Yi Ding, Mountain View, CA (US)

( * ) Notice: Subject to any disclaimer, the term of this patent is extended or adjusted under 35 U.S.C. 154(b) by 1028 days.

(21) Appl. No.: 16/993,724

(22) Filed: Aug. 14, 2020

(65) Prior Publication Data

US 2022/0051080 A1 Feb. 17, 2022

(51) Int. Cl.
*G06N 3/04* (2023.01)
*G06F 18/21* (2023.01)
*G06F 18/2113* (2023.01)
*G06F 18/214* (2023.01)
*G06F 40/216* (2020.01)
*G06N 3/044* (2023.01)
*G06N 3/045* (2023.01)
*G06T 1/20* (2006.01)

(52) U.S. Cl.
CPC ......... *G06N 3/044* (2023.01); *G06F 18/2113* (2023.01); *G06F 18/2155* (2023.01); *G06F 40/216* (2020.01); *G06N 3/045* (2023.01); *G06T 1/20* (2013.01)

(58) Field of Classification Search
CPC ......... G06N 20/00; G06N 3/044; G06N 3/045
See application file for complete search history.

(56) References Cited

PUBLICATIONS

Devlin, Jacob, et al. "Bert: Pre-training of deep bidirectional transformers for language understanding." arXiv preprint arXiv: 1810.04805 (2018). (Year: 2018).*
Vaswani, Ashish, et al. "Attention is all you need." Advances in neural information processing systems 30 (2017). (Year: 2017).*
Fang, Mingfeng, et al. "Using bidirectional LSTM with BERT for Chinese punctuation prediction." 2019 IEEE International Conference on Signal, Information and Data Processing (ICSIDP). IEEE, 2019. (Year: 2019).*
Bhatia, Vedant, et al. "End-to-end resume parsing and finding candidates for a job description using bert." arXiv preprint arXiv: 1910.03089 (2019). (Year: 2019).*
Li, Yutong, Juanjuan Cai, and Jingling Wang. "A text document clustering method based on weighted Bert model." 2020 IEEE 4th Information Technology, Networking, Electronic and Automation Control Conference (ITNEC). vol. 1. IEEE, 2020. (Year: 2020).*
Quan, Wei, Jinli Zhang, and Xiaohua Tony Hu. "End-to-end joint opinion role labeling with BERT." 2019 IEEE International Conference on Big Data (Big Data). IEEE, 2019. (Year: 2019).*

(Continued)

*Primary Examiner* — Van C Mang
(74) *Attorney, Agent, or Firm* — Zhong Law, LLC (57) ABSTRACT

A system and method include one or more processing devices to implement a sequence of transformer neural networks, first and second sequence-to-sequence layers that each comprises a sequence of nodes, and an output layer to provide the first set and second set of score vectors to a downstream application of a natural language processing (NLP) task.

21 Claims, 7 Drawing Sheets (56) References Cited

PUBLICATIONS

Zu, Shicheng, and Xiulai Wang. "Resume information extraction with a novel text block segmentation algorithm." Int J Nat Lang Comput 8 (2019): 29-48. (Year: 2019).*

Qiu, Jiezhong, et al. "Blockwise self-attention for long document understanding." arXiv preprint arXiv:1911.02972 (2019). (Year: 2019).*

* cited by examiner

SYSTEM, METHOD, AND COMPUTER PROGRAM FOR TRANSFORMER NEURAL NETWORKS

TECHNICAL FIELD

The present disclosure relates to improvements to computer technologies such as machine learning in natural language processing (NLP), and in particular to a system, method, and storage medium including executable computer programs for transformers neural network models used for processing text-based documents.

BACKGROUND

Natural language processing is a type of computer technology applied to processing and analyzing natural language data. The natural language data can be text-based documents such as a stream of text messages, a technical paper, a resume, or a form. The language can be any types of natural language used in people's daily life including, but not limited to, English, Spanish, French, and Chinese. The processing and analyzing natural language data may solve practical problems such as identifying the topics of the natural language data, identifying and correcting errors in the natural language data, and identifying the best match between two documents (e.g., between a resume and a job description). Compared with human operators, the computer technology used in NLP may achieve consistent end results much faster with a much higher accuracy. Further, the computer technology may reach beyond the capability of human operators. For example, the computer technology may rely on machine learning models trained based on examples. The data driven approach may eliminate the explicit or implicit human bias associated with each human operator, and therefore achieve bias-free or less biased end results, which cannot be achieved with a particular human operator.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

When machine learning is used in a particular NLP task, a machine learning model is first learned (or trained) using a training dataset. Typically, the training dataset may have been labeled by data specialists for a specific task. For example, the name entity recognition/classification for English names may require the pre-labeled names in the training dataset. The pre-labeling may include assign attributes to each name in the documents, where the attributes may include family name/given name, gender associated with the name, origination countries/regions of the name etc.

One challenge facing the application of machine learning to NLP tasks is the lack of task-specific training datasets. Although the NLP data are widely available, the creation of a NLP training dataset calibrated to a specific task can be time-consuming and cost-prohibitive. This is because there are numerous NLP tasks, and it is very costly to create a full machine learning model for each task. Also, the training of a full machine learning model may require a large amount of training data, creating another layer of difficulty to identify NLP data that are suitable for task-specific training dataset.

To overcome the lack of task-specific NLP training dataset, two-stage machine learning approaches are developed. In the first stage, general purpose machine learning model using unannotated text data (e.g., those available on the world-wide webs). The general purpose machine learning model is not designed for a specific NLP task, and the unannotated text data are usually widely available. The first stage is commonly referred to as the pre-training stage. In the second stage, an output layer is provided to receive the output from the general purpose machine learning model. The parameters of the output layer is fine-tuned using task-specific training dataset during a training process. Since the output layer is a single layer on top of the general purpose machine learning model, only a small task-specific training dataset is needed to fine tune the output layer. In this way, an effective NLP machine learning model can be constructed with a small task-specific training dataset and unannotated training datasets.

One class of such general purpose machine learning model used in NLP is the so called Bidirectional Encoder Representations from Transformers (BERT) model. In this disclosure, the BERT model includes different variations of BERT models including, but not limited to, ALBERT (a Lite BERT for Self-Supervised Learning of Language Representations), ROBERTA (Robustly Optimized BERT Pretraining Approach), and DistillBERT (a distilled version of BERT).

Prior to BERT, a NLP machine learning model (e.g., recurrent neural networks (RNNs)) sequentially examines the words in a document in one direction—i.e., from left to right, from right to left, or a combination of left to right and then right to left. This one-directional approach may work well for certain tasks. To achieve deeper understanding of the underlying text, BERT employs bidirectional training Instead of identifying the next word in a sequence of words, BERT may use a technique called Masked Language Modeling (MLM) that may randomly mask words in a sentence and then try to predict the masked words from other words in the sentence surrounding the masked words from both left and right of the masked words. Thus, the training of the NLP machine learning model using BERT takes into consideration words from both direction simultaneously during the training process.

A word may be represented using a word embedding which can be a vector of numbers that may be derived based on a linguistic model. The linguistic model can be context-free or context-based. An example of the context-free model is word2vec that may be used to determine the vector representation for each word in a vocabulary. In contrast, context-based models may generate a word embedding associated with word based on other words in the sentence. In BERT, the word embedding associated with a word may be calculated based on other words within the input document using the previous context and the next context. This approach as explained later is more suitable for a short input document with fewer than 512 words.

Different types of neural networks (e.g., the recurrent neural network (RNN)) may be used as the underlying multi-layered machine learning model but each has limitations. The RNN may read the words in a sentence sequentially in one direction. In certain applications, the RNN may not be suitable for the most efficient implementation on fast computing devices such as tensor processing units (TPUs) and graphics processing units (GPUs). For example, to ascertain the meaning of a word "bank," the RNN model may need to read many words step by step until reaching the word of "river" or "money" to provide a context for the word "bank." The process of RNN is not suitable for parallel processing using TPUs or GPUs. In contrast, the convolutional neural network (CNN) architecture is suitable for parallel implementations using TPUs or GPUs because the CNN explores local dependencies. The distance between two words in a sentence of N words is in the order of log(N) compared to N for the RNN. The CNN, however, is not very effective for determining the dependencies among all words in the sentence.

A transformer neural network (referred to as the "Transformer" herein) is designed to overcome the deficiencies of RNN and CNN architectures, thus achieving the determination of word dependencies among all words in a sentence with fast implementations using TPUs and GPUs. The Transformer may include encoders and decoders (e.g., six encoders and six decoders), where encoders have identical or very similar architecture, and decoders may also have identical or very similar architecture. The encoders may encode the input data into an intermediate encoded representation, and the decoder may convert the encoded representations to a final result. An encoder may include a self-attention layers and a feed forward layer. The self-attention layers may calculate attention scores associated with a word. The attention scores, in the context of this disclosure, measure the relevance values between the word and each of the other words in the sentence. Each relevance may be represented in the form of a weight value.

In some implementations, the self-attention layer may receive the word embedding of each word as input. The word embedding can be a vector including 512 data elements. The self-attention layer may further include a projection layer that may project the input word embedding vector into a query vector, a kay vector, and a value vector which each has a lower dimension (e.g., 64). The scores between a word and other words in the input sentence are calculated as the dot product between the query vector of the word and key vectors of all words in the input sentence. The scores may be fed to a Softmax layer to generate normalized Softmax scores that each determines how much each word in the input sentence expressed at the current word position. The attention layer may further include the multiplication operations that multiply the Softmax scores with each of the value vectors to generate the weighted scores that may maintain the value of words that are focused on while reducing the attentions to the irrelevant words. Finally, the self-attention layer may sum up the weighed scores to generate the attention values at each word position. The attention scores are provided to the feed forward layer. The calculations in the feed forward can be performed in parallel while the relevance between words is reflected in the attention scores.

Each of the decoder may similarly include a self-attention layer and a feed forward layer. The decoder may receive input and information from the encoder. Thus, a BERT system may be constructed using the transformer neural network trained using unannotated text documents.

BERT systems perform best when trained using input sequences within a length limit of 512 words. The performance of the BERT systems may suffer significantly when the lengths of the input documents exceed the 512 words. The documents processed by certain application, however, often exceed the 512 word upper limit. For example, a human resource (HR) application may receive resumes to be matched with job descriptions. Both the resumes and the job descriptions routinely exceed the 512 word limit. Thus, there is a need for adapting BERT system for longer input sequences.

To overcome the above-identified and other deficiencies in the current NLP neural networks, implementations of the disclosure provides for a BERT network system that may process large text document (more than 512 words) with improved performance and efficiency. One implementation of the disclosure may include a system that includes one or more processing devices and one or more storage devices for storing instructions that when executed by the one or more processing device cause the one or more processing devices to implement a sequence of transformer neural networks. Each transformer neural network in the sequence may receive a segment of a stream of word embeddings, where each segment of the stream includes a determined number of word embeddings calculated from a section of a text document, two adjacent transformer neural networks in the sequence receive two segments corresponding to two adjacent sections that have at least one overlapping word; and calculate an output vector comprising relevance parameters, where each of the determined number of relevance parameters represents a contextual relevancy between a current word with another word in the section. The one or more processing devices may further implement first and second sequence-to-sequence layers that each comprises a sequence of nodes. Each node of the sequence of nodes may receive the output vector generated by a corresponding transformer in the sequence of transformer neural network; receive a retained information from an adjacent node; and calculate a score vector based on the received output vector and the retained information, where the first sequence-to-sequence layer may process the received output vectors sequentially in a forward direction to generate a first set of score vectors, and the second sequence-to-sequence layer is to process the received output vectors sequentially in a reverse direction to generate a second set of score vectors. The one or more processing devices may further implement an output layer to provide the first set and second set of score vectors to a downstream application of a natural language processing (NLP) task.

Figure 1:
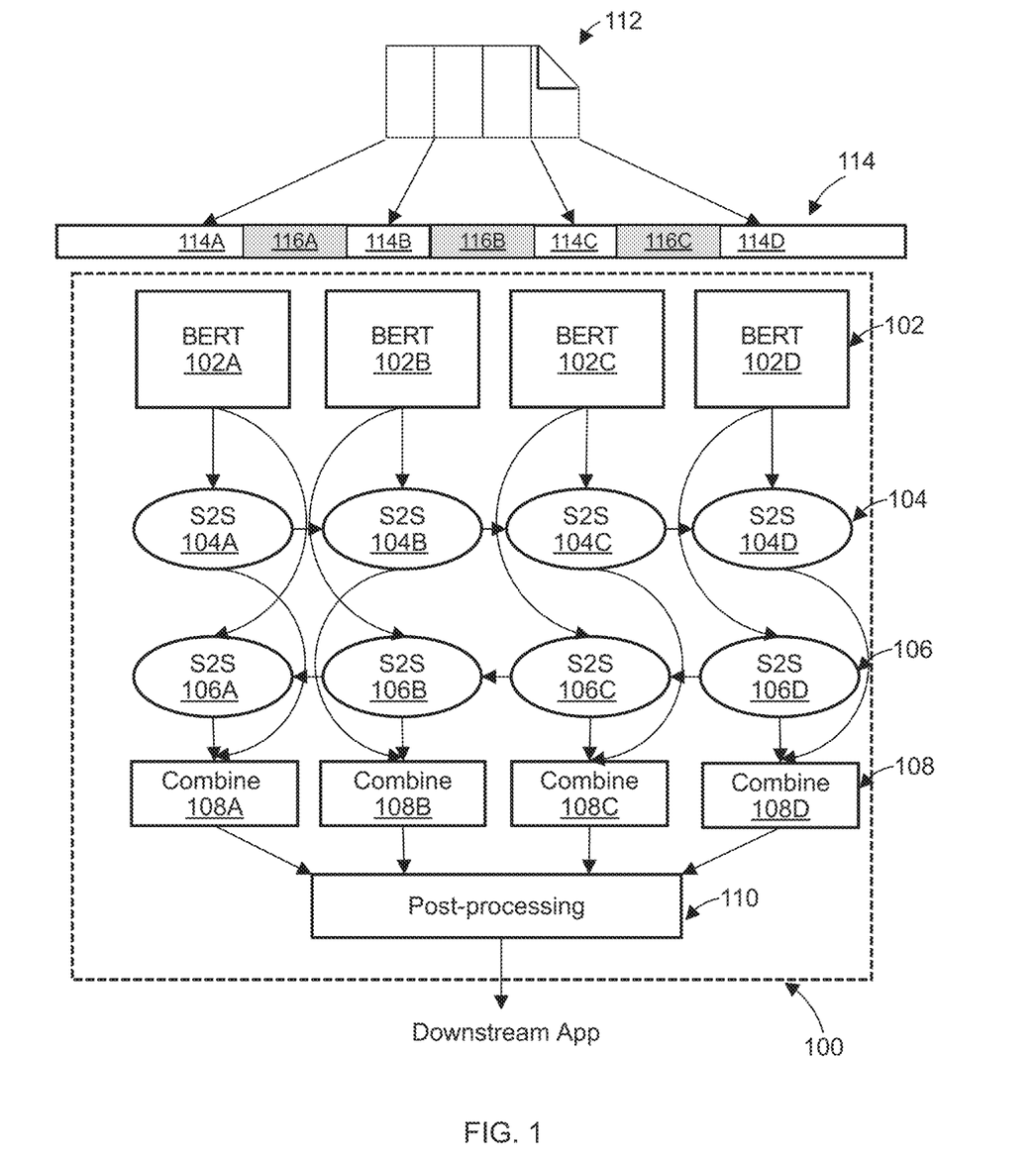
FIG. 1 illustrates a system for processing NLP documents using a Bidirectional Encoder Representations from Transformers (BERT) neural network layer according to an implementation of the disclosure.

FIG. 1 illustrates a system 100 for processing NLP documents using a Bidirectional Encoder Representations from Transformers (BERT) neural network layer according to an implementation of the disclosure. System 100 can be a stand-alone computer system or a networked computing resource implemented in a computing cloud. System 100 may include one or more processing devices and one or more storage devices. The one or more processing devices can be hardware processor(s) such as central processing units (CPUs), tensor processing units (TPUs), graphic processing units (GPUs), or accelerator circuits, where certain types of processing devices such as TPUs and/or GPUs may be designed for parallel calculations of a large amount of independent neural network calculation modules. One or more storage devices can include a memory device, a hard disc, or a cloud storage connected to the one or more processing devices through a network interface card.

Referring to FIG. 1, the one or more processing devices may implement a sequence of transformers 102, a first sequence-to-sequence layer 104, a second sequence-to-sequence layer 106, a combination layer 108, and a post-processing layer 110. System 100 may be designed to process large documents 112 such as those documents containing more than 512 words. In this disclosure, a word refers to a single unit of linguistic elements used with others to form a sentence, where the word can be the linguistic unit of any natural languages or artificial languages. A pre-processor (not shown) may calculate the word embedding for each word in document 112, and in some embodiments, the pre-processor may apply stemming or other pre-filtering techniques to document 112, causing deletion of words that have diversity correlations including gender or race indicators to promote a bias-free model. The pre-processor may calculate the word embeddings offline in advance and store the word embeddings for later calculations, thus achieving real-time performance. In one implementation, the pre-processor can be a component of system 100 implemented using the one or more processing devices of system 100. Alternatively, the processor can be implemented on a processing device independent from system 100. In one implementation, the pre-processor may include a software application running on a processing device that implements a group of models (e.g., word2vec) for calculating the word embeddings. The group of models can be context-free models for calculating word embeddings free of context or context-based models for calculating word embeddings based on context (e.g., a word in the context of other words in a sentence). A word embedding can be a vector containing data elements of a certain length (e.g., 512 data elements), where words that have the same meaning may have a similar representation. The conversion of words in documents 112 into word embeddings allows for the processing of the document by machine learning system such as system 100.

Document 112 may include paragraphs composed of sentences, and sentences composed of words. Thus, document 112 can be composed of a sequence of words, and correspondingly, the pre-processor may calculate a stream of word embeddings 104 based on NLP models, where each word embedding is associated with a corresponding word in the document. As discussed above, although BERT neural networks are suitable for NLP processing tasks (e.g., the task of translation), a BERT neural network cannot effectively process large documents directly when the number of words in the document exceeds 512.

To overcome this and other deficiencies, the pre-processor may divide the stream of word embeddings into segments of word embeddings 114A-114D, where each segment include no more than 512 word embeddings corresponding to no more than 512 words in document 112. In one implementation, to further improve the performance of system 100, the pre-processor may generate overlapping segments of word embeddings. As shown in FIG. 1, adjacent segments within the stream 114 may share a common sub-segment of word embeddings. For example, segments 114A, 114B may share a common sub-segment 116A; segments 114B, 114C may share a common sub-segment 116B; segments 114C, 114D may share a common sub-segment 116C etc.

Different strategies may be employed to set the end point of a segment. In one implementation, a segment may match a natural paragraph of text that ends with a period or line-change prompt. In another implementation, a segment may be a section of a document, where the section can be formed according to the type of the document. For example, a resume may naturally include different sections such as objective, work experience, skill, education, and award sections. In another implementation, the segment can be context independent, where each segment may include an identical number of words. The context independent strategy may have the advantages of consistency across different domains of applications and guaranteed uniform distribution of numbers of word embeddings among different segments. The uniformity of numbers of word embeddings among different segments may ensure that the number of word embeddings within a pre-determined limit (e.g., 512), thus ensuring the performance of the subsequent BERT neural networks. The overlapping sub-segments 116A. 116B, 116C may include at least one common word embedding. In one preferred implementation to further improve performance, a sub-segment 116A. 116B, 116C may include 10% of word embeddings contained in any one of segments 114A-114D. The variation of overlapping word embedding may impact the performance.

System 100 may receive, as input data, segments 114A-114D of word embeddings derived from stream 114. System 100 may include the one or more processing devices to implement a sequence of transformer neural networks 102. In one implementation, the sequence 102 may include BERT neural networks 102A-102D. Each of BERT neural networks 102A-102D may include an identical architecture (i.e., same components and topology). Further, BERT neural network 102A-102D may have been trained using unannotated text data that are readily available on the Internet. In this disclosure, transformer neural networks in sequence 102 can be any available type of BERT, ALBERT, ROBERTA, or DistillBERT neural networks. For concise description, these different flavors of neural network are collectively referred to as BERT.

Figure 2:
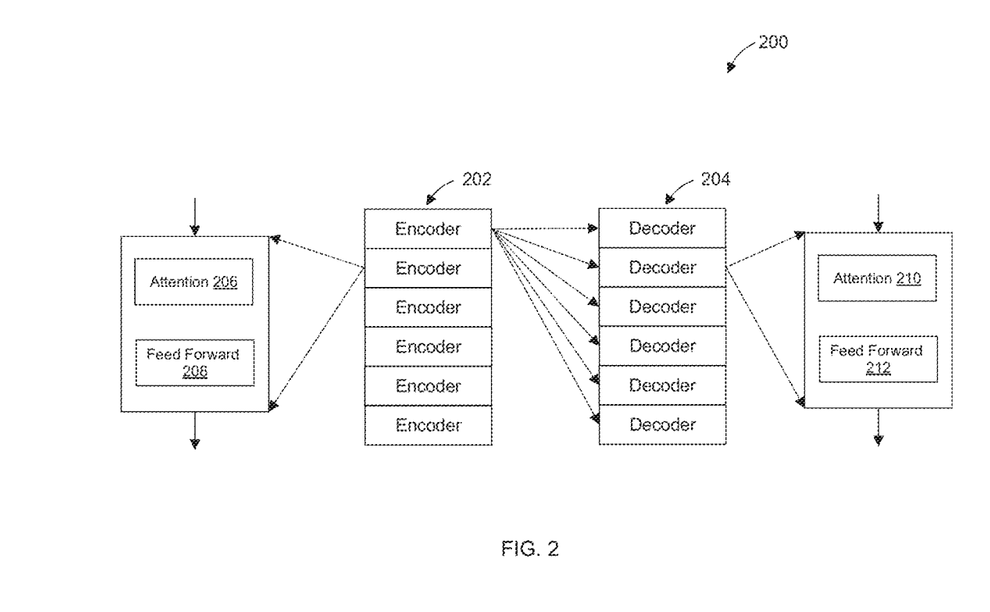
FIG. 2 illustrates the structure of a BERT neural network according to an implementation of the disclosure.

FIG. 2 illustrates the structure of a BERT neural network 200 according to an implementation of the disclosure. Referring to FIG. 2, BERT neural network 200 may include stacked-up encoders 202 coupled to stacked-up decoders 204. In one implementation, BERT neural network 200 may include six (6) stacked-up encoders 202 and six (6) stacked-up decoders 204. The encoders therein may sequentially process input data which in this disclosure is a segment of word embeddings 114A-114D. A first encoder in the stacked-up encoders 202 may receive a segment of word embeddings 114A-114D, and then process to generate a first encoded representation output. The output of the first encoder may be fed as the input data to a second encoder in the stacked-up encoders 202 to generate a second encoded representation output. In this way, the segment of word embeddings may be sequentially processed through to generate a final encoded representation output.

The decoders therein may receive the encoded representation outputs (e.g., any one of the first through the final encoded representation output) from stacked-up encoders 202, and sequentially process to generate the final results.

In one implementation, each encoder in stacked-up encoders 202 may include a common architecture, and similarly, each decoder in stacked-up decoders 204 may also include a common architecture. As shown in FIG. 2, each encoder may include an attention layer 206 and a feed forward layer 208. Attention layer 206 can be a self-attention layer that may calculate vectors of attention scores for input data, where a vector of attention scores associated with an input data point may represent the relevancies between the present input data point with other input data points. In the example of text documents, the attention layer 206 of the first encoder may receive the word embeddings and calculate a respective vector of attention scores for each word embedding. The vector of attention scores may represent the relevancies between the present word embedding (or word) with other word embeddings (or words) in the segment. The vectors of attention scores may be fed into the feed forward layer 208. Feed forward layer 208 may perform linear calculations that may transform the vectors of attention scores into a form that may be fed into a next encoder or decoder. Since the vectors of attention scores are independent from each other, the calculations of feed forward layer 208 can be performed in parallel using TPUs or GPUs to achieve higher computation efficiency.

Similarly, each decoder in stacked-up decoders may also include an attention layer 210 and a feed forward layer 212. In a practical application such as machine translation between two different languages, the document containing the source language may be fed into the stacked-up encoders, and the documents containing the target language may be fed into the stacked-up decoders during the training process. In one implementation, stacked-up encoders 202 and stacked-up decoders 204 are fully connected, meaning each decoder may receive not only the final but all intermediate encoded representation outputs from stacked-up encoders 202. The stacked-up decoders 204 may generate an output vector of a fixed length (e.g., 512) for the BERT neural network 102A-102D. The output vector may represent relevance parameters, wherein each of the of relevance parameters represents a contextual relevancy between a current word with another word in the section.

BERT neural networks 102A-102D may be trained using unannotated text data and processed in parallel because each BERT neural network 102A-102D operates independently. The output vectors from the transformer layer 102 may be fed, as input data, into two sequence-to-sequence layers 104, 106. Referring to FIG. 1, sequence-to-sequence layer 104 may include nodes 104A-104D that are sequentially connected to form a forward processing pipeline, and sequence-to-sequence layer 106 may include nodes 106A-106D that are sequentially connected to form a reverse processing pipeline. Each node 104A-104D in sequence-to-sequence layer 104 may receive an output vector from a corresponding BERT 102A-102D, and process them sequentially in a forward direction. The forward direction in this disclosure represents from the beginning to the end of document 112. In contrast, each node 106A-106D in sequence-to-sequence layer 106 may also receive an output vector from a corresponding BERT 102A-102D, and process them sequentially in a reverse direction. The reverse direction in this disclosure represents from the end to the beginning of document 112. By processing the outputs from BERT layer 102 in both directions, implementations may take into consideration context information from both directions for each word in the input document.

In addition to the input data from BERT neural networks 102A-102D, each node in sequence-to-sequence layers 104, 106 may receive retained information from a previous node in the sequence-to-sequence processing pipeline, thus providing further context information to the present node. The retained information received from the previous node may encode the local context information (short term memory) and optionally, remote context information (long term memory). Example sequence-to-sequence nodes may be composed of recurrent neural network (RNN) nodes, long and short-term memory (LSTM) nodes, additional transformer layers that are trained using application-specific training data, linear layers, and convolutional neural network (CNN) layers.

Figure 3:
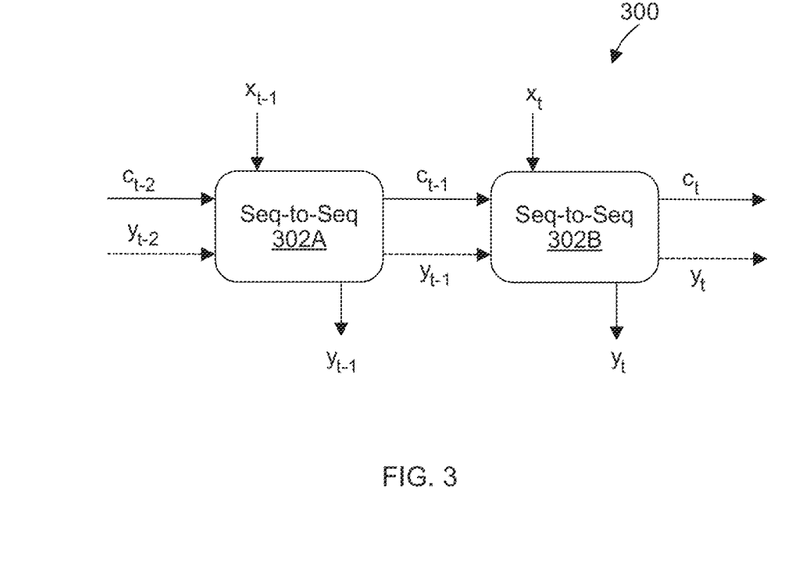
FIG. 3 illustrates the interconnection between two adjacent nodes in a sequence-to-sequence layer according to an embodiment of the disclosure.

FIG. 3 illustrates the interconnection between two adjacent nodes in a sequence-to-sequence layer 300 according to an embodiment of the disclosure. As shown in FIG. 3, layer 300 may include a first node 302A and a second node 302B connected to the first node in sequence. Each node 302A, 302B may receive input data $x_{t-1}$, $x_t$, respectively generated by a BERT neural network. Additionally, each node 302A, 302B may receive retained information from an adjacent node situated at a prior location on the processing pipeline. For example, node 302A may receive retained information ($c_{t-2}$, $y_{t-2}$) from a prior node, and node 302B may receive retained information ($c_{t-1}$, $y_{t-1}$) from node 302A and so on. The retained information may include local context information $c_t$ of a prior node, where the local context information $c_t$ may be an internal state of the prior node. The retained information may further include an output $y_t$ generated by the prior node. The output $y_t$ may encode not only the local context information of the prior node but also context information from a remote node.

A current node (e.g., node 302B) may calculate an output (e.g., $y_t$) for the current node based on the input data (e.g., $x_t$) and the retained information (e.g., $c_{t-1}$ and/or $y_{t-1}$). The current node may also generate retained information (e.g., $c_t$ and/or $y_t$) for a subsequent node in the pipeline. As shown in FIG. 3, the calculation of a current node may depend on the retained information generated in a prior node in the pipeline except for the first node where there is no prior retained information. The first node in the forward direction corresponds to the node processing the beginning segment of the input document, or the first node in the reverse direction corresponds to the node processing the last segment of the input document.

Referring to FIG. 1, since each of sequence-to-sequence layers 104, 106 is calculated sequentially in order, the node calculation in sequence-to-sequence layer 104, 106 is implemented for sequential calculations. In one implementation, the parameters of nodes in sequence-to-sequence layer 104, 106 are trained using task-specific annotated training data set. Since BERT neural networks 102A-102D are trained using unannotated data, they can be available off-the-shelves in advance. Then, a small set of training dataset labeled for a specific task is needed to train both sequence-to-sequence layers 104, 106 using the off-the-shelves BERT neural networks 102A-102D. In this way, the task-specific layers 104, 106 may be fine-tuned using a small training dataset.

The outputs of sequence-to-sequence layer 104 can be calculated independently from and in parallel with the outputs of sequence-to-sequence layer 106. The outputs from sequence-to-sequence layers 104, 106 may be provided to combination layer 108 for combination calculation. Combination layer 108 may include combination nodes 108A-108D. Each combination node 108A-108D may receive a first output vector generated by a corresponding node in sequence-to-sequence layer 104 and a second output vector generated by a corresponding node in sequence-to-sequence layer 106, and combine the two output vectors into a combined vector. The combination calculation can be a concatenation of corresponding results from layers 104 and 016. In other implementations, the combination calculation can be a pooling function such as, for example, a mean function, a max function, or another neural network layer. Combination layer 108 may provide the combined vectors to post-processing layer 110.

In one implementation, post-processing layer 110 may include an average layer to perform an element-wise average for combined vectors generated by combination nodes 108A-108D, and a SoftMax layer to perform SoftMax calculation on the vector containing the element-wise averages. The output vector generated by the SoftMax layer may be provided to a downstream application which can be a machine translation application.

In another implementation, the downstream application can be a human resource application for automatically identifying/ranking a job candidate without explicit or implicit bias of a human recruiter. This application may involve analyzing talent profiles (e.g., resumes) of job candidates using machine learning models trained based on historical hiring data and performance data of past hires and candidates, and comparing the talent profiles against descriptions of jobs. The applications of the disclosure may include, but not limited to, matching a job candidate (e.g., a resume or profile of the candidate) with job descriptions, matching a job description to job candidates, identifying similar job candidates, identifying similar job descriptions, and inferring a job position from a query including one or more words.

Figure 4A:
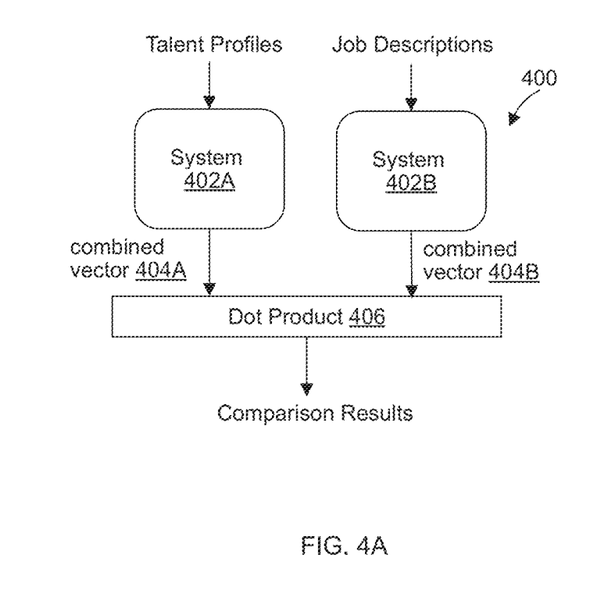
FIG. 4A illustrates a human resource (HR) application for processing talent profiles against job descriptions according to an implementation of the disclosure.

FIG. 4A illustrates a human resource (HR) application 400 for processing talent profiles against job descriptions according to an implementation of the disclosure. For this application, talent profiles can be large documents including more than 512 words. HR application 400 may include a system 402A, constructed similar to system 100) including the BERT neural network layer, the two sequence-to-sequence layers, and the combination layer, to process talent profiles and generate combined vectors 404A. HR application 400 may further include another system 402B similarly constructed as system 402A to process job descriptions and generate combined vectors 404B. Combined vectors 404A characering talent profiles and combined vectors 404B characterizing job descriptions may be fed into a comparison layer 406 (e.g., a dot product layer) that may compare vectors 404A against vectors 404B to generate comparison results. The comparison results may be used to evaluate a talent profile against a job opening without bias.

Implementations of the disclosure may further be used for clustering representations of a set of input documents based on similarity measures. The clusters of representations may be used for identifying similar job candidates, identifying similar job descriptions, and inferring an implied meaning from a query including one or more words. In one implementation, the clustering operations can be part of the post-processing 110 as shown in FIG. 1. Alternatively, the clustering may be implemented as a different layer in connection with the post-processing 110.

Figure 4B:
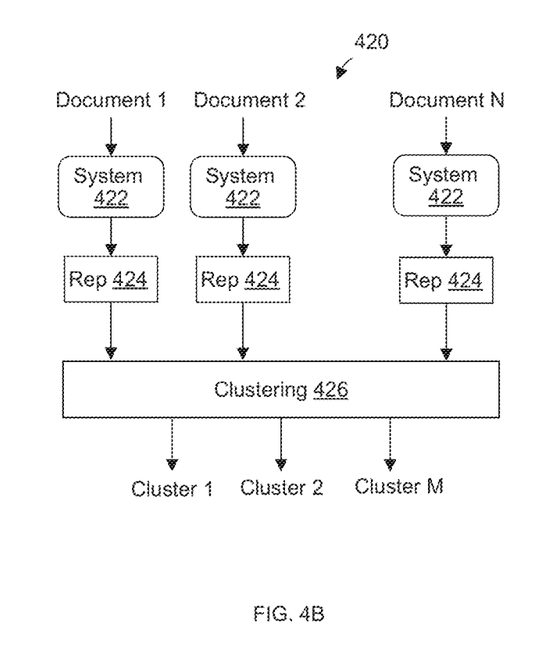
FIG. 4B illustrates a similarity calculation system using clustering operations according to an implementation of the disclosure.

FIG. 4B illustrates a similarity calculation system 420 using clustering operations according to an implementation of the disclosure. Similarity calculation system 420 may be built upon BERT neural network system 100 as shown in FIG. 1. As shown in FIG. 4B, similarity calculation system 420 may include BERT neural network systems 422 that may be similarly constructed as system 100 as shown in FIG. 1. System 422 may include identical or similar components as system 100. In one implementation, multiple copies of system 422 may run in parallel to process documents 1, 2, . . . , N (such as, resumes, job descriptions), where N can be a large integer value (e.g., >1000). Alternatively, one system 422 may run to process documents 1, 2, . . . , N in serial. Depending on the practical problems to be solved, documents 1, 2, . . . , N can be resumes or profiles of job candidates, job descriptions, or queries including one or more words.

For each one of documents 1, 2, . . . , N, system 422 may calculate a vector representation 424 for the corresponding document. The vector representation can be the combined vectors generated at the output of the combination layer 108 as shown in FIG. 1. Thus, each document 1, 2, . . . , N may be represented by a super vector including the combined vectors for the document. The vector representations 424 may be stored in a storage device, or passed directly to a subsequent clustering layer 426.

Similarity calculation system 420 may further include the clustering layer 426 that may perform cluster calculation based on representations 424 to cluster representations 424 into one or more clusters in accordance with similarity measurements. In one implementation, the clustering calculation can use an unsupervised clustering model (e.g., K-means or any suitable unsupervised clustering algorithms) The clustering model used can be a parameterized model or a non-parameterized model that may generate clusters 1, 2, . . . , M, where M is an integer value that is smaller than the total number (N) of documents. These clusters 1, 2, . . . , M can then be used in indexing documents 1, 2, . . . , N. After clustering, each document 1, 2, . . . , N may be labeled as belonging to a certain cluster 1, 2, . . . , M. The cluster labels may improve search and retrieval of the documents.

The clusters 1, 2, . . . , M may help identify candidates with similar job profiles (e.g., those profiles within a same cluster) or job openings with similar descriptions (e.g., those job descriptions within a same cluster). Additionally, the distance between two representations within a cluster may indicate how similar the two corresponding documents are. For example, if the distance between the representation of candidate profile A and the representation of candidate profile B is smaller than the distance between those of candidate profile A and candidate profile C, candidate profile A is more similar to candidate profile B than candidate profile C. Thus, system 420 may rank documents 1, 2, . . . , N based on the similarity measurements. For example, for a new document entry, system 420 may rank, based on clusters 1, 2, . . . , M, the similarities of the new document with respect to each of documents 1, 2, . . . , N, and present the ranking on a user interface in an intuitive manner to the user.

In one implementation, the clusters can be used in a search application. For a given search query including one or more words (e.g., a selected segment of a profile or a job description), system 420 may calculate a representation of the query, and determine nearest clusters for the query. The documents within the nearest clusters may be used as the bases for retrieval. In one implementation, the matching between the query and the documents in the nearest clusters are determined in terms of a cosine similarity measurement (or any other appropriate distance measurement such as the Euclidean distance). These documents may be ranked and presented according to the similarity measurements (i.e., how close) to the query. This may help improve the search for a similar document. For example, a user may select a query by highlighting a segment of text in a document (e.g., a skill description in a profile) on a user interface, system 420 may identify documents (e.g., other profiles) that are similar to the query and present them in a ranked order representing the similarities between these documents and the query.

In one implementation, system 420 may allow the search application to provide results above and beyond keyword search by making inference. For example, if the query is "I lead the team responsible for ranking of all News Feed and recommendations across Social Network Co. I also helped build various parts of infrastructure, algorithms and products in News Feed over several years" which is an excerpt from a resume, system 420 may infer that, based on clusters, that the person is at a senior technical manager position because it is a common trait in the cluster although the query itself does not mention about seniority. Thus, system 420 may derive a job title from a query that does not inquire about the job title, further improving the search capability. In this regard, system 420 may identify common traits (e.g., a machine learning skill etc.) within a cluster with ranking, and then based on the common traits to retrieve documents (e.g., resumes, job descriptions) explicitly or implicitly containing the common trait.

Figure 5:
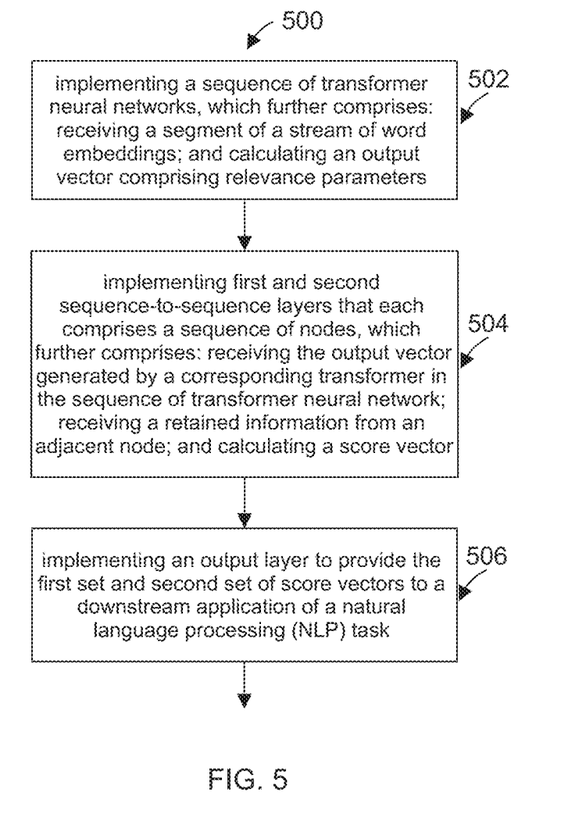
FIG. 5 illustrates a flowchart of a method for analyzing large documents using segmented BERT neural networks according to an implementation of the disclosure.

FIG. 5 illustrates a flowchart of a method 500 for analyzing large documents using segmented BERT neural networks according to an implementation of the disclosure. Method 500 may be performed by processing devices that may comprise hardware (e.g., circuitry, dedicated logic), computer readable instructions (e.g., run on a general purpose computer system or a dedicated machine), or a combination of both. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 5, one or more processing devices may, at 502, implement a sequence of transformer neural networks. In particular, the one or more processing devices may receive a segment of a stream of word embeddings, where each segment of the stream may include a determined number of word embeddings calculated from a section of a text document, two adjacent transformer neural networks in the sequence receive two segments corresponding to two adjacent sections that have at least one overlapping word, and calculate an output vector comprising relevance parameters, where each of the determined number of relevance parameters represents a contextual relevancy between a current word with another word in the section. In one implementation, to speed up the calculation, the embeddings associated with a text document (e.g., the profiles of job candidates) can be pre-calculated offline in advance and cached in a storage. The caching of embeddings may allow real-time implementation of system 100.

At 504, the one or more processing devices may implement first and second sequence-to-sequence layers that each comprises a sequence of nodes. In particular, the one or more processing devices may receive the output vector generated by a corresponding transformer in the sequence of transformer neural network, receive retained information from an adjacent node, and calculating a score vector, where the first sequence-to-sequence layer is to process the received output vectors sequentially in a forward direction to generate a first set of score vectors, and the second sequence-to-sequence layer is to process the received output vectors sequentially in a reverse direction to generate a second set of score vectors.

At 506, one or more processing devices may implement an output layer to provide the first set and second set of score vectors to a downstream application of a natural language processing (NLP) task.

Compared to traditional BERT neural network implementations where words exceeding the 512 word upper limit are disregarded, implementations of the disclosure may take into consideration all words in a large document by dividing the document into overlapping segments. Implementations may then process different segments in parallel using a BERT neural network layer containing multiple BERT nodes, and then using forward and reverse direction sequence-to-sequence layers to further fine-tune the results to a specific task. Implementations of the disclosure have been tested to show superior performance for NLP tasks.

Figure 6:
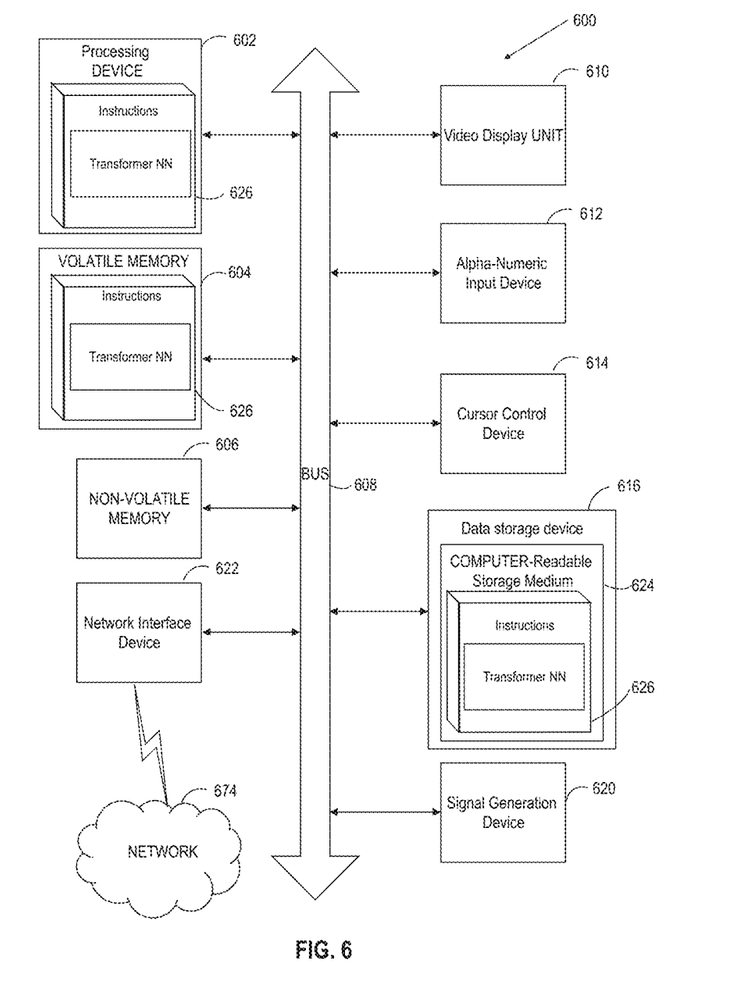
FIG. 6 depicts a block diagram of a computer system operating in accordance with one or more aspects of the present disclosure.

FIG. 6 depicts a block diagram of a computer system 600 operating in accordance with one or more aspects of the present disclosure. In various illustrative examples, computer system 600 may implement transformer neural networks system 100 of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC)

microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions of the transformer neural networks system 100 of FIG. 1 for implementing method 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system comprising one or more processing devices and one or more storage devices for storing instructions that when executed by the one or more processing devices cause the one or more processing devices to implement:
   a sequence of trained transformer neural networks, wherein each of the trained transformer neural networks in the sequence is to:
      receive a segment of a stream of word embeddings, wherein each segment of the stream comprises a determined number of word embeddings calculated from a section of a text document, two adjacent transformer neural networks in the sequence receive two segments sharing an overlapping sub-segment that includes at least one word; and
      calculate an output vector comprising relevance parameters, wherein each of the determined number of relevance parameters represents a contextual relevancy between a current word with another word in the section;
   first and second sequence-to-sequence layers that each comprises a sequence of nodes, wherein each node of the sequence of nodes is to
      receive the output vector generated by a corresponding transformer in the sequence of transformer neural networks;
      receive a retained information from an adjacent node; and
      calculate a score vector based on the received output vector and the retained information, wherein the first sequence-to-sequence layer is to process the received output vectors sequentially in a forward direction to generate a first set of score vectors, and the second sequence-to-sequence layer is to process the received output vectors sequentially in a reverse direction to generate a second set of score vectors; and
   an output layer to provide the first set and second set of score vectors to a downstream application of a natural language processing (NLP) task.

2. The system of claim 1, wherein the one or more processing devices are further to implement:
   a combination layer comprising a sequence of combination nodes, wherein each of the sequence of combination nodes is to receive a corresponding first score vector from the first sequence-to-sequence layer and a corresponding second score vector from the second sequence-to-sequence layer; and combine the first score vector and the second score vector, wherein the output layer is to provide the combined first and second score vectors to the downstream application.

3. The system of claim 1, wherein the sequence of trained transformer neural networks are trained using a first set of unannotated text data, and wherein the first and second sequence-to-sequence layers are trained using a second set of annotated text data that are labeled specifically for the NLP task.

4. The system of claim 1, wherein each transformer neural network in the sequence comprises stacked-up encoders and stacked-up decoders, and wherein each of the encoders comprises an attention layer and a feed forward layer, and each of the decoders comprises an attention layer and a feed forward layer.

5. The system of claim 4, wherein an attention layer of a first encoder of the stacked-up encoders is to receive the segment of the stream of word embeddings;

calculate, using the received segment of the stream of word embeddings, an attention score vector for each word in the section of words associated with the segment of the stream of word embeddings; and provide the attention score vector to a feed forward layer of the first encoder to generate a first filtered attention score vector.

6. The system of claim 5, wherein an attention layer of a second encoder of the stacked-up encoders is to receive, from the feed forward layer of the first encoder, the first filtered attention score vector;

calculate, using the first filtered attention score vector, a second attention score vector; and provide the second attention score vector to a feed forward layer of the second encoder to generate a second filtered attention score vector.

7. The system of claim 6, wherein the stacked-up decoders are to receive the attention score vectors from the stacked-up encoders, and generate the output vector comprising the relevance parameters.

8. The system of claim 1, wherein the one or more processing devices comprise at least one of a tensor processing unit (TPU) or a graphics processing unit (GPU) that is capable of parallel computing, and wherein the at least one of the TPU or the GPU is to implement the sequence of transformer neural network for parallel calculation, and to implement the first and second sequence-to-sequence layers for sequential calculation.

9. The system of claim 1, wherein the first and second sequence-to-sequence layers are one of long short-term memory layers (LSTM) or recurrent neural network layers (RNN).

10. The system of claim 1, wherein the text document comprises more than 512 words, wherein each section of the text document comprises no more than 512 words, and wherein the at least one overlapping word comprises 10% of words in each of the two adjacent sections.

11. The system of claim 1, wherein the one or more processing device are to implement:

a second sequence of transformer neural networks, wherein each transformer neural network in the second sequence is to:

receive a segment of a stream of word embeddings derived from a second text document; and calculate a second output vector comprising relevance parameters; and third and fourth sequence-to-sequence layers that calculate a third set and a fourth set of score vectors, respectively, wherein the one or more processing devices are to further implement a comparison layer to compare a combination of the first set of score vectors and the second set of score vectors against a combination of the third set of score vectors and the fourth set of score vectors.

12. The system of claim 11, wherein the text document comprises a resume of a job candidate, and the second text document comprises a job description, and wherein the comparison layer comprises a dot product calculation between two vectors.

13. The system of claim 2, wherein the one or more processing devices are further to implement: a clustering layer to cluster the combined first and second score vectors into one of a plurality of clusters, and wherein responsive to receiving a query including one or more words, the one or more processing devices are to determine a nearest cluster to the query, and retrieve at least one text document from the nearest cluster based on a similarity measurement between the query and the at least one text document.

14. A method comprising:

implementing, by one or more processing device, a sequence of transformer neural networks, wherein implementing the sequence of trained transformer neural networks comprises implementing each transformer neural network in the sequence comprises:

receiving a segment of a stream of word embeddings, wherein each segment of the stream comprises a determined number of word embeddings calculated from a section of a text document, two adjacent transformer neural networks in the sequence receive two segments sharing an overlapping sub-segment that includes at least one word; and calculating an output vector comprising relevance parameters, wherein each of the determined number of relevance parameters represents a contextual relevancy between a current word with another word in the section;

implementing first and second sequence-to-sequence layers that each comprises a sequence of nodes, wherein implementing each node of the sequence of nodes comprises:

receiving the output vector generated by a corresponding transformer in the sequence of transformer neural networks;

receiving retained information from an adjacent node; and calculating a score vector based on the received output vector and the retained information, wherein the first sequence-to-sequence layer is to process the received output vectors sequentially in a forward direction to generate a first set of score vectors, and the second sequence-to-sequence layer is to process the received output vectors sequentially in a reverse direction to generate a second set of score vectors; and implementing an output layer to provide the first set and second set of score vectors to a downstream application of a natural language processing (NLP) task.

15. The method of claim 14, further comprising:

implementing a combination layer comprising a sequence of combination nodes, wherein implementing each of the sequence of combination nodes comprises receiving a corresponding first score vector from the first sequence-to-sequence layer and a corresponding second score vector from the second sequence-to-sequence layer; and combining the first score vector and the second score vector, wherein the output layer is to provide the combined first and second score vectors to the downstream application.

16. The method of claim 14, wherein the sequence of trained transformer neural networks are trained using a first set of unannotated text data, and wherein the first and second sequence-to-sequence layers are trained using a second set of annotated text data that are labeled specifically for the NLP task.

17. The method of claim 14, wherein implementing each transformer neural network in the sequence comprises implementing stacked-up encoders and stacked-up decoders, and wherein each of the encoders comprises an attention layer and a feed forward layer, and each of the decoders comprises an attention layer and a feed forward layer.

18. The method of claim 14, wherein the one or more processing devices comprise at least one of a tensor processing unit (TPU) or a graphics processing unit (GPU) that is capable of parallel computing, and wherein implementing the sequence of transformer neural network comprises implementing the sequence of transformer neural network using the at least one of the TPU or the GPU for parallel calculation, and implementing the first and second sequence-to-sequence layers comprises implementing the first and second sequence-to-sequence layers for sequential calculation.

19. The method of claim 14, wherein the first and second sequence-to-sequence layers are implemented as one of long short-term memory layers (LSTM) or recurrent neural network layers (RNN).

20. The method of claim 14, wherein the text document comprises more than 512 words, wherein each section of the text document comprises no more than 512 words, and wherein the at least one overlapping word comprises 10% of words in each of the two adjacent sections.

21. A machine-readable non-transitory storage media encoded with instructions that, when executed by one or more processing devices, cause the one or more processing devices to:

a sequence of trained transformer neural networks, wherein each transformer neural network in the sequence is to:

receive a segment of a stream of word embeddings, wherein each segment of the stream comprises a determined number of word embeddings calculated from a section of a text document, two adjacent transformer neural networks in the sequence receive two segments sharing an overlapping sub-segment that includes at least one word; and calculate an output vector comprising relevance parameters, wherein each of the determined number of relevance parameters represents a contextual relevancy between a current word with another word in the section;

first and second sequence-to-sequence layers that each comprises a sequence of nodes, wherein each node of the sequence of nodes is to receive the output vector generated by a corresponding transformer in the sequence of transformer neural networks;

receive a retained information from an adjacent node; and calculate a score vector based on the received output vector and the retained information, wherein the first sequence-to-sequence layer is to process the received output vectors sequentially in a forward direction to generate a first set of score vectors, and the second sequence-to-sequence layer is to process the received output vectors sequentially in a reverse direction to generate a second set of score vectors; and an output layer to provide the first set and second set of score vectors to a downstream application of a natural language processing (NLP) task.

* * * * *